Feb. 1, 1966 — R. C. HEIBERG — 3,232,358
CABLE PLOW

Filed March 21, 1963 — 2 Sheets-Sheet 1

INVENTOR.
ROBERT C. HEIBERG
BY
*Geo. R. Schermerhorn*
Attorney

Feb. 1, 1966 R. C. HEIBERG 3,232,358
CABLE PLOW

Filed March 21, 1963 2 Sheets-Sheet 2

INVENTOR.
ROBERT C. HEIBERG
BY
*Attorney*

United States Patent Office 3,232,358
Patented Feb. 1, 1966

3,232,358
CABLE PLOW
Robert C. Heiberg, Portland, Oreg., assignor, by mesne assignments, to Sam Abrams, Portland, Oreg.
Filed Mar. 21, 1963, Ser. No. 266,936
6 Claims. (Cl. 172—742)

This invention relates to a cable plow for laying cables underground.

A cable plow is more in the nature of a ripper tooth than a plow in that it penetrates the ground to a considerable depth but is relatively narrow and not shaped to turn over a furrow. The cable to be laid is fed downward along the rear side of the plowing implement so as to be introduced into the ground to the depth of the plow point. In view of the narrow width of the plow, it does not produce an open trench and the earth immediately and automatically falls together to cover the cable as fast as it is laid without a separate backfilling operation. Cable plows are usually arranged for hitching onto the back of a tractor carrying a spool of the cable whereby a tractor driver alone can lay cable quickly and economically in any ground that can be plowed.

Conventional equipment of the type described presents some difficulties in turning corners and in laying cable in sloping ground and is not as convenient to manipulate as may be desired. Laying cable on a side hill is difficult with conventional equipment and it is not possible to lay a cable in a line offset to one side of the path of the tractor while utilizing the full power of the machine.

The general object of the present invention is, therefore, to provide a cable plow which will overcome the disadvantages and shortcomings enunmerated above. Other objects are to provide an improved tractor hitch for a cable plow, to provide a cable plow which tends to hold a tractor on a straight ahead course along a side hill or embankment, to provide a cable plow which will operate closely along a fence or pole line and to provide a cable plow which will lay cable in a line offset to one side of the vehicle which pulls the plow.

Certain of the aforementioned objects are accomplished by providing a tractor hitch which is shiftable laterally by power operated means, such as a hydraulic cylinder, while the tractor is operating. Such an adjustment of the line of draft while the tractor is in motion facilitates turning corners on short radius and enables the operator to balance the tendency of the tractor to turn downhill when running along a side hill. Thus, the operator can follow a straight course on a side hill without the usual zigzag corrective movements.

Another improvement involves a joint in the draft arm of the plow itself whereby through the agency of a hydraulic cylinder the plow may be turned at an angle from the line of the draft arm. This causes the plow to act as a paravane, seeking a position offset laterally from the pivotal connection of the draft arm with the tractor hitch. Then, by shifting the draft connection to one side of the tractor, the plow itself may be caused to follow a course to one side of the tractor instead of directly behind the tractor. In this way a cable may be laid as closely as desired to a fence or pole line, or it may be laid along the shoulder of a roadway while the tractor is running on the road. These several functions are unique with the present construction and have not been attainable with conventional equipment.

The foregoing and other objects and advantages will become apparent and the invention will be better understood with reference to certain preferred embodiments illustrated in the accompanying drawings and described in the following specification. Various changes may be made, however, in details of construction and arrangement of parts, and all such modifications within the scope of the appended claims are included in the invention.

Figure 1:
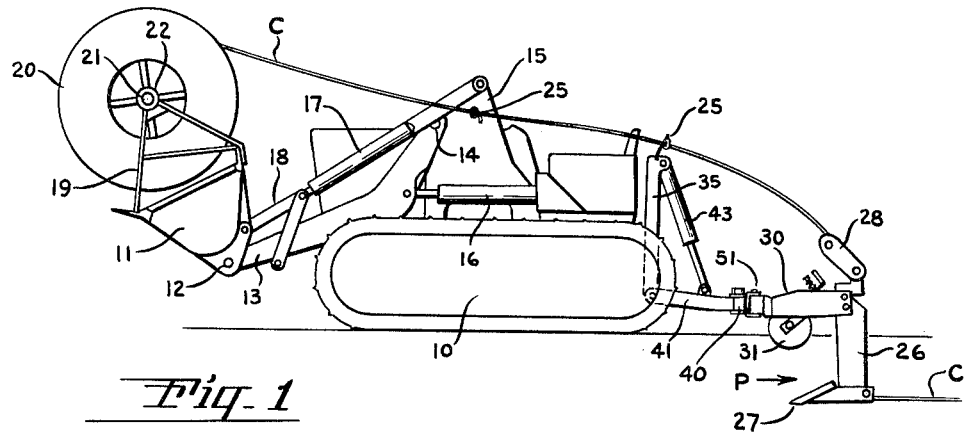
FIGURE 1 is a side elevation view of a tractor-mounted cable plow embodying certain features of the invention.

Referring first to FIGURE 1, the tractor 10 has a dozer blade 11 pivotally mounted at 12 on a pair of forwardly extending arms 13 on opposite sides of the tractor. Each of these arms is pivotally mounted at 14 on an upstanding bracket 15 connected with the tractor frame. The arms and the dozer blade may be raised and lowered by hydraulic piston and cylinder units 16. The dozer blade may be tilted forward and back on the forward ends of the arms by means of hydraulic cylinder and piston units 17 and toggle linkages 18.

The dozer blade is equipped with a reel carrier 19 for a reel 20 of cable C, such as telephone cable. When the dozer blade is lowered to the ground and tilted forward, the reel may be rolled on the ground into the reel carrier so that the reel axle 21 may be secured in suitable sockets 22 on the reel carrier. Then the dozer blade is lifted and tilted back so that the reel is carried as shown in FIGURE 1 during a cable laying operation.

The end of the cable C is drawn from the reel and passed through guides 25 to the plow P. The plow comprises a vertical standard 26 carrying at its lower end a furrow-forming point 27. Mounted on the upper end of standard 26 is a swivelling cable guide 28. The rear side of the standard is equipped with suitable guide means for leading the cable down to the lower end of the plow and then allowing it to trail off horizontally in the bottom of the furrow dug by the plow, as shown. The upper end of vertical standard 26 is supported by a plow frame draft arm 30 which is pivotally connected to hitch means on the rear of the tractor.

As the plow passes through the ground, the cable is laid in the bottom of the plow furrow. The plow point and its vertical standard 26 are relatively narrow whereby the earth is not disturbed appreciably on either side of the plow and a furrow is not overturned as in the case of an agricultural plow. Thus, the earth falls together and closes the furrow immediately behind the plow to automatically backfill the trench or furrow on top of the cable which has been laid. The vertical standard 26 may be adjustable vertically in the plow frame 30 to vary the depth of the cable, and the plow frame may be equipped with a colter wheel 31, if desired.

The foregoing structure is generally similar to that shown in the Knapp et al. Patent No. 3,037,357. The present invention involves the improvements shown in FIGURES 2 to 5.

Figure 2:
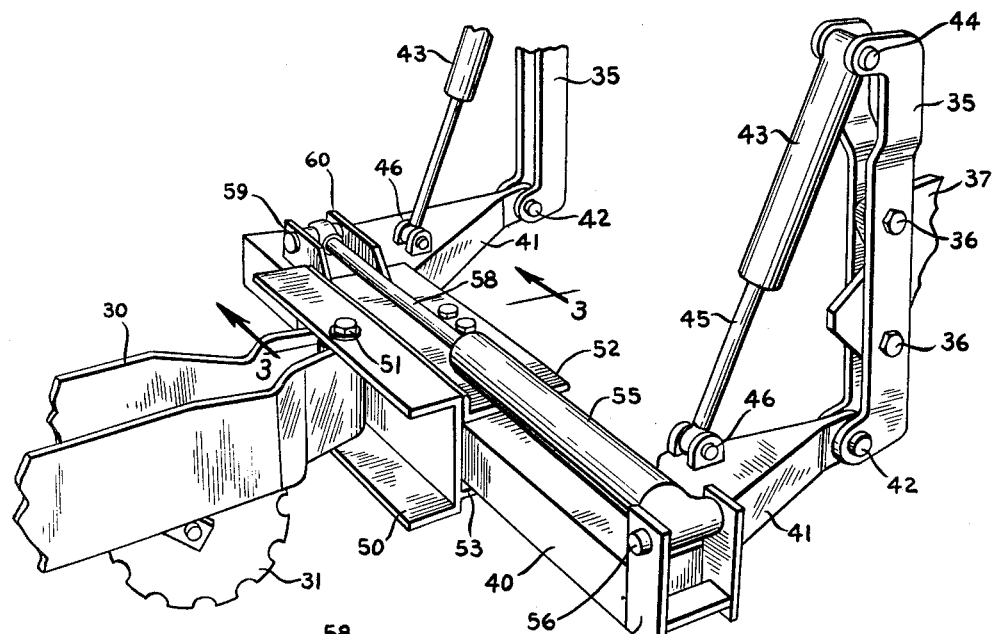
FIGURE 2 is an enlarged fragmentary perspective view of the tractor hitch in FIGURE 1.
Figure 3:
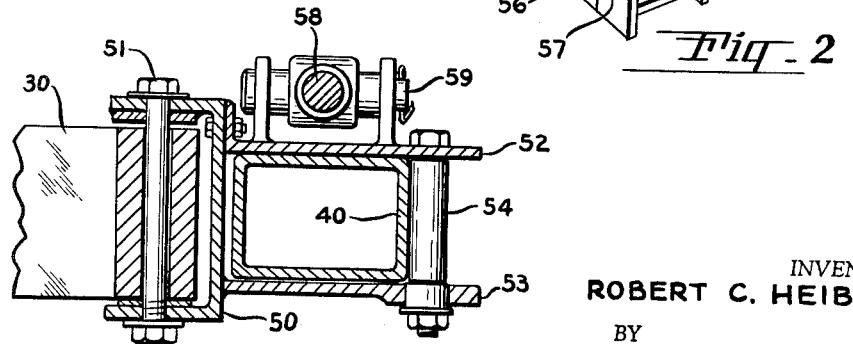
FIGURE 3 is a further enlarged sectional view taken on the line 3—3 of FIGURE 2.

As shown in FIGURES 2 and 3, the tractor hitch comprises a pair of vertical frame members 35 rigidly bolted at 36 to a pair of brackets 37 on the rear end of the tractor frame. A transverse track bar 40 has forwardly extending arms 41 at its opposite ends pivotally connected at 42 with the lower ends of frame members 35. This track bar may be raised and lowered by a pair of hydraulic cylinders 43 having pivotal connections 44 at their upper ends with the upper ends of frame members 35. Piston rods 45 in these cylinders are pivotally connected at 46 with the arms 41.

Mounted on the track bar 40 is a sliding hitch block 50 equipped on its rear side with apertures for a vertical kingpin or draft pin 51 for pivotal connection with the front end of plow frame 30. Hitch block 50 has upper and lower plates 52 and 53 overlying and underlying the bar 40 to provide broad bearing surfaces for sliding movement on the bar. The forward ends of plates 52 and 53 carry vertical rollers 54 which engage the front side of the track bar. Hitch block 50 may be shifted along the track bar by a hydraulic cylinder 55 which has one end pivotally connected at 56 with bracket ears 57 on one end of the track bar. Piston rod 58 in this cylinder has its free end pivotally connected at 59 with a pair of ears 60 on the end of the hitch block which is remote from the pivot 56. Thus, the hitch block may be shifted from one end to the other of track bar 40 to move the kingpin 51 laterally of the tractor while the plow is working.

By making the cylinder half the length of the track bar and locating the piston connection 59 half the length of the piston rod beyond kingpin 51, the kingpin will travel one-fourth the length of the track bar in opposite directions from its center with a single cylinder and with all parts of the traverse mechanism contained within the length of the track bar. The length of the track bar may be approximately equal to the width of the tractor whereby there is no impairment of side clearance.

The hydraulic connections for actuating the three pistons are not shown since these details of the relatively simple hydraulic system are fully understood by persons skilled in the art and do not require illustration in order to practice the invention. The control valves are mounted in a position convenient to the operator while driving the tractor whereby the plow may be raised and lowered and hitch block 50 shifted on its track bar 40 while the tractor is in motion.

Cylinder 55 is a double-acting cylinder having hydraulic connections at its opposite ends and controlled by a three-way valve having two positions for movement to the left and right and a third position establishing a hydraulic lock to hold the piston stationary in any adjusted position. Cylinders 43 are preferably double-acting cylinders similarly controlled by a suitable valve. Fluid pressure is admitted to the lower ends of these cylinders to raise the plow and to the upper ends of the cylinders to lower the plow into the ground. The lower position of track bar 40 may be determined by the cylinder heads which limit the extension of the piston rods. The present arrangement provides a high angle of lift for the arms 41 and track bar 40 whereby the plow is lifted high above the ground for travel to and from the site of a cable-laying operation.

In laying cable around a corner, the hitch block is shifted to the inside of the turn to provide the shortest possible radius of curvature in the bend. This also facilitates turning of the tractor by shifting the line of draft toward the side of the tractor which is on the inside of the turn.

In laying cable on a side hill, such as a roadway embankment, with conventional equipment the tractor normally tends to turn and slide downhill whereby the tractor must be turned in an uphill direction in order to counteract this tendency and lay the cable in a straight line. This is difficult with a crawler-type tractor where steering is effected by declutching one of the endless tracks. Small steering corrections cannot be made smoothly but result in a series of jogging movements which produce a somewhat zigzag cable pattern in the ground.

This difficulty is entirely overcome with the present hitch arrangement. The hitch block is merely shifted toward the uphill side of the tractor until a point is reached at which the eccentric drawbar pull of the plow balances the tendency of the tractor to turn and slide downhill so that the operator can drive straight ahead with both track clutches engaged. In practice, the operator will quickly find this point of balance. Shifting the hitch block too far toward the uphill side will make the tractor turn uphill and, when it is not shifted far enough, the tractor will tend to turn downhill.

The present hitch is also of advantage in laying a cable on the shoulder of a paved roadway, particularly where the shoulder is narrow. By shifting the hitch block toward the outside end of the track bar, the tractor does not require as wide a shoulder to make the plow clear the edge of the pavement as when the hitch is limited to a central position.

Figure 4:
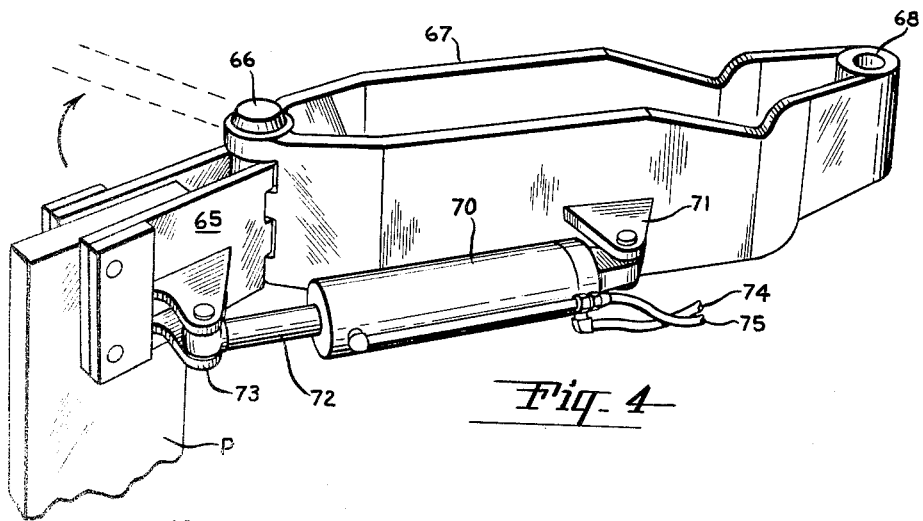
FIGURE 4 is a perspective view of a modification embodying additional features of the invention.
Figure 5:
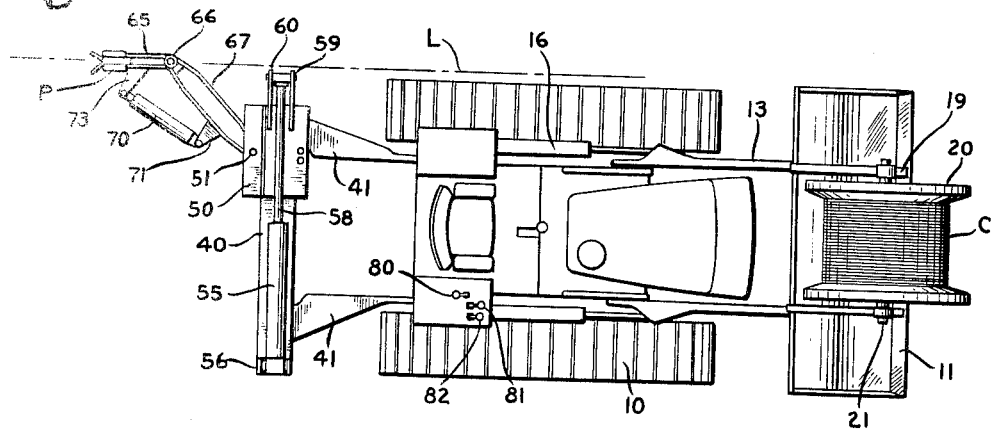
FIGURE 5 is a top plan view showing the modification of FIGURE 4 in operation on a tractor.

Still further advantages are attained from the modification shown in FIGURES 4 and 5. In this case the plow P has a short frame or arm 65 which is pivotally connected at its front end through a vertical hinge 66 with the rear end of a longer draft arm 67. The front end of arm 67 has a vertical bearing 68 for the kingpin 51. The rest of the hitch is the same as described in connection with FIGURES 2 and 3. In this case, however, the plow is not equipped with a colter wheel.

A double-acting hydraulic cylinder 70 is pivotally connected at its front end between a pair of outstanding ears 71 on one side of the arm 67. The rear end of piston rod 72 is similarly pivotally connected between a pair of outstanding ears 73 on the plow frame or short arms 65. The opposite ends of the cylinder have hydraulic connections 74 and 75 for swinging the plow frame 65 on its hinge 66. The range of movement is such that the plow frame will swing about 45° to either side of the vertical plane of the arm 67.

This movement is controlled by an additional valve of a conventional type used with double-acting cylinders and having a hydraulic lock position for holding the piston fixed in any position of adjustment. Suitable control valves are shown in FIGURE 5 where, for example, the valve handle 80 may control the cylinders 43 to raise the plow out of the ground, the valve handle 81 may control the cylinder 55 to shift the hitch block right or left, and the valve handle 82 may control the cylinder 70 to swing the plow right or left on its draft arm 67.

One additional advantage of the second embodiment is readily apparent in FIGURE 5. The plow is elongated in the direction of travel and thereby has directional characteristics in the ground similar to the action of a paravane attached to a mine sweeper. Swinging the rear arm 65 to the right causes the ground reaction on the plow to swing the front arm 67 to the left on its kingpin 51. Thus, by placing the hitch block at the left end of the track bar and deflecting arm 65 to the right as shown, the plow will follow a line L to the left of the left end of the track bar and left side of the tractor. This permits the tractor to remain on a paved roadway and lay cable in the shoulder along the edge of the pavement. The described paravane action is, of course, symmetrical whereby cable may be also laid in a position outboard from the tractor on the right side by merely reversing the deflection of arm 65 on arm 67. Obviously, this second embodiment also possessess all the other advantages of the first embodiment.

It will be noted in FIGURE 5 that the line of draft is not only eccentric or offset from the center of gravity or center of tractive effort of the tractor but is also oblique with respect to direction since the line of draft must lie in the vertical plane of front arm 67. This is so because the pivotal connection at kinpin 51 has free turning movement whereby there can be no moment of forces about the vertical axis of the kingpin. By angling the plow in relation to draft arm 67 the plow seeks an offset position which changes the angle of pull on the tractor.

When the oblique direction of the line of traction is disadvantageous the plow may be caused to follow directly behind the kingpin by merely adjusting the rear arm 65 into alignment with the front arm 67. The second embodiment will then function same as the first embodiment.

A conventional plow in offset position tends to turn the tractor whereby it becomes impossible to plow straight ahead on level ground while utilizing the full power of the tractor. For example, if the plow is offset to left or center it tends to turn the tractor to the left. The present rudder action changes the direction of pull from a line parallel with the tractor to a line in an oblique direction. With the parts proportioned as shown in FIGURE 5 the line of pull of arm 67 passes to the right of the center of the tractor and would tend to turn the tractor to the right. By selecting different proportions for the length of the hitch and the length of arm 67, the line of pull in this extreme position of the plow may be caused to pass close to the center of the tractor so that a turning moment of objectionable magnitude is not introduced. This is an ideal condition which can be sufficiently closely approximated to greatly improve the functions of a cable plow.

The FIGURE 4 embodiment is also of advantage in turning a corner in that it can utilize the paravane action of the plow to change the direction of pull so as to assist the turning movement even without shifting the kingpin connection. Thus, the FIGURE 4 plow on a conventional stationary kingpin hitch will possess the advantages of the shifting kingpin hitch of FIGURE 2 used with a conventional plow. These advantages pertain to straight forward side hill plowing as well as to turning.

In FIGURE 5 it is to be understood that the cable would normally extend from the reel 20 back to the plow as shown in FIGURE 1. This reach of the cable has been omitted in order to clarify the illustration of the salient features of the invention.

Having now described my invention and in what manner the same may be used, what I claim as new and desire to protect by Letters Patent is:

1. A cable laying plow comprising a draft arm which is an integral part of the plow, a free swinging vertical pivotal draft connection in the front end of said draft arm for detachable connection with a tractor hitch to pull the plow, a furrow-forming part which is symmetrical on its opposite sides connected with the trailing end of said draft arm by a vertical pivot, and cylinder and piston means interconnecting said draft arm and furrow-forming part to turn said furrow-forming part relative to said draft arm and cause said furrow-forming part to act as a paravane in the ground and steer the plow on a course offset to one side of said pivotal draft connection.

2. A cable laying plow comprising a plow share having an earth dividing point substantially symmetrical on each side of a vertical plane; a draw bar; a pivot having a vertical axis connecting said plow share to said draw bar; a second freely turnable pivot having a vertical axis for connecting the opposite end of said draw bar to a tractor; and means operable during forward motion of the plow to vary the angular relationship between said vertical plane of said plow share and a vertical plane which includes both pivotal axes of said draw bar.

3. A cable laying plow according to claim 2 including hydraulic means also and independently operable during forward movement of the plow to shift said second named pivot horizontally to either side of a vertical plane which passes substantially through the centerline of said tractor.

4. A cable laying plow comprising: a horizontal transverse track bar adapted for mounting on a tractor; a hitch block mounted for movement along said bar; means operable during forward movement of said plow to move said hitch block to either side of the center of said bar; a plow draft arm having a front end connected to said hitch block for pivotal movement about a vertical axis; a furrow forming plow element, symmetrical on both sides of a central plane, said plow element being connected to the rear end of said draft arm for pivotal movement about a vertical axis; and means operable during forward movement of said plow to adjust the angular relationship between the central plane of said furrow forming plow element and said draft arm, said hitch block moving means being able to counteract the transverse drag of said plow element occasioned by said adjustment of said angular relationship between said plow element and said draft arm.

5. A method of plowing a cable laying furrow offset to one side of a tractor having a draft hitch for pulling a plow, which plow has a draft arm portion and a furrow forming portion which is symmetrical on its opposite sides comprising: causing said furrow forming portion to act as a paravane in the ground to steer the plow on a course parallel to but offset laterally from that of said draft hitch by providing a freely horizontal swinging relationship between the forward end of the draft arm portion and the draft hitch and turning said furrow forming portion at an angle to said draft arm portion.

6. A tractor and cable laying plow for laying a cable offset beyond one side of the tractor comprising a tractor hitch on the tractor having a vertical pin connection adjacent said one side of the tractor, said plow comprising a draft arm and a furrow-forming portion, said furrow-forming portion being symmetrical on its opposite sides, said draft arm being pivotally connected at its forward end to said pin connection and having at its rear end a vertical axis pivotal connection with said furrow-forming portion, and a cylinder and piston connected between said draft arm and furrow-forming portion to swing said furrow-forming portion at an angle to said draft arm, said draft arm being of sufficient length to offset the plow beyond said one side of the tractor when the draft arm is swung to one side of said vertical pin connection, said draft arm having free pivotal movement on said hitch pin causing said furrow-forming portion to act as a paravane in the ground and plow in an offset path as determined by said angle.

References Cited by the Examiner

UNITED STATES PATENTS

| | | | |
|---|---|---|---|
| D. 143,970 | 2/1946 | Heath. | |
| 135,912 | 2/1873 | Hinckley | 172—477 |
| 449,331 | 3/1891 | Phinney | 172—667 |
| 1,428,543 | 9/1922 | Gallagher | 172—627 X |
| 1,428,903 | 9/1922 | Porterfield | 280—468 |
| 1,464,446 | 8/1923 | Shiltz | 280—470 |
| 1,739,508 | 12/1929 | Fincher et al. | 172—667 |
| 1,833,763 | 11/1931 | Topick | 172—477 |
| 2,510,817 | 6/1950 | Greiner et al. | 172—115 |
| 2,718,719 | 9/1955 | Anderson | 37—143 |
| 2,922,660 | 1/1960 | Haugland et al. | 280—468 |
| 2,998,965 | 9/1961 | Larson | 172—669 X |
| 3,024,851 | 3/1962 | Harres | 172—669 X |
| 3,140,745 | 7/1964 | Hinkle et al. | 172—742 X |

FOREIGN PATENTS

| | | |
|---|---|---|
| 598,425 | 9/1959 | Italy. |
| 322,548 | 8/1958 | Switzerland. |

References Cited by the Applicant

UNITED STATES PATENTS

| | | |
|---|---|---|
| 2,184,912 | 12/1939 | Freeman et al. |
| 2,338,334 | 1/1944 | Kastenschmidt. |
| 2,416,207 | 2/1947 | Olson. |
| 2,513,783 | 7/1950 | Blessinger. |
| 2,600,016 | 6/1952 | Miller. |
| 2,653,031 | 9/1953 | Butler. |
| 2,756,658 | 7/1956 | Drummond. |
| 3,037,357 | 6/1962 | Knapp et al. |

ABRAHAM G. STONE, *Primary Examiner.*

T. GRAHAM CRAVER, ANTONIO F. GUIDA,
*Examiners.*

Notice of Adverse Decision in Interference

In Interference No. 96,094 involving Patent No. 3,232,358, R. C. Heiberg, CABLE PLOW, final judgment adverse to the patentee was rendered Aug. 8, 1968, as to claims 2 and 5.

[*Official Gazette October 29, 1968.*]